INVENTOR.
William C. Boyce
BY
W. R. Robertson
AGENT

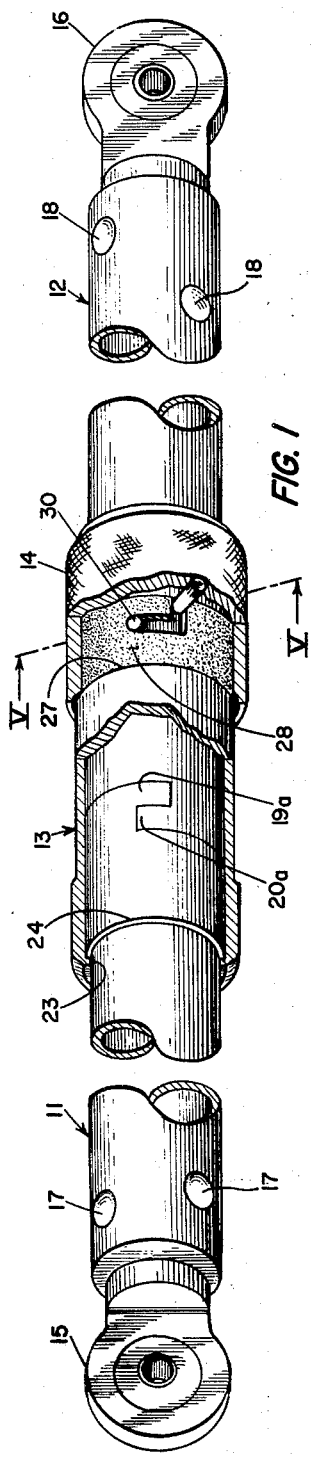
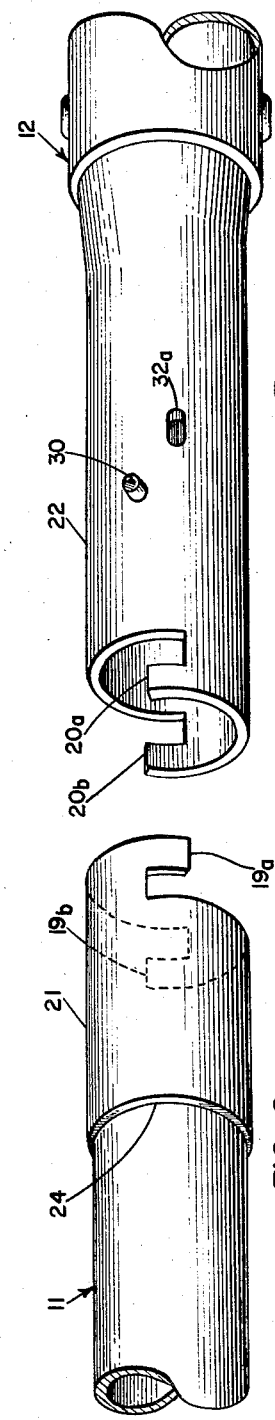
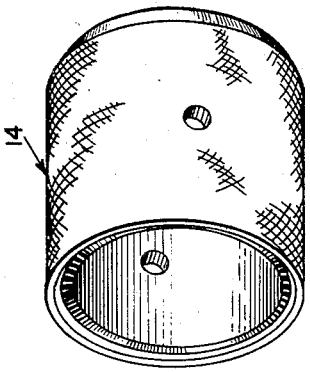
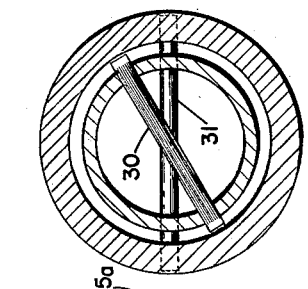
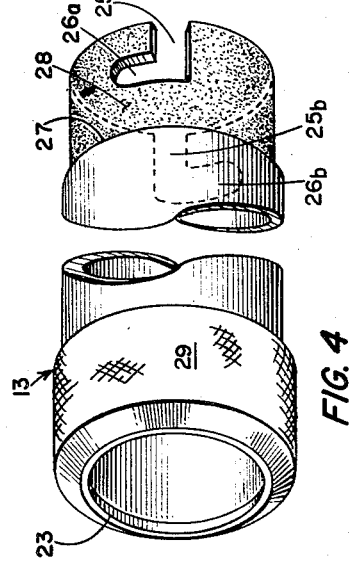
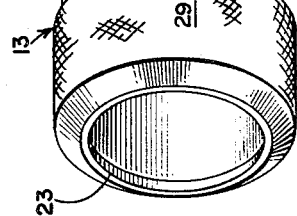
INVENTOR.
William C. Boyce
BY
*W. R. Robertson*
AGENT Dec. 9, 1958   W. C. BOYCE   2,863,685
HIGH-STRENGTH LIGHT-WEIGHT QUICK-DISCONNECT
COUPLING FOR A LINKAGE SYSTEM
Filed Jan. 20, 1956   2 Sheets-Sheet 2

United States Patent Office 2,863,685
Patented Dec. 9, 1958

2,863,685

HIGH-STRENGTH LIGHT-WEIGHT QUICK-DISCONNECT COUPLING FOR A LINKAGE SYSTEM

William C. Boyce, Dallas, Tex., assignor to Chance Vought Aircraft, Incorporated, Dallas, Tex., a corporation of Delaware Application January 20, 1956, Serial No. 560,378

12 Claims. (Cl. 287—104)

The present invention relates to a quick-detachable connection or coupling between two links in a linkage system. More specifically, this invention relates to an improved means for quick detachment and secure connection of the lapped ends of two push, pull, or torsion members having interlocking fingers which are maintained in interlocked position by two telescopic sleeves slideable thereover, one sleeve being detachably locked against both axial and torsional movements by the other sleeve.

A primary object of this invention is to provide a quick-disconnect coupling for a tensional, compressional, and torsional force linkage system that is a strong but light coupling, and which enables quick disconnection and reengagement without necessitating detachment at the link ends wherein all axial and torsional forces are carried by high strength designed fingers and not carried by mere pins, screw threads, or rivets.

Another object of this invention is to provide a quick-disconnect coupling assembly which is a light, safe, slip-proof and positive locking connection between two links of a linkage system, such as but not limited to an aircraft control system, and which coupling cannot become accidently disconnected.

Yet another object of this invention is to provide a quick-disconnect coupling for a linkage system designed for operation in cramped, limited spaces and for operation wherein the length adjustment of the linkage system is not disturbed, due to the exact original length of the quick-disconnect assembly being re-established upon its reconnection. Further, locking and unlocking can be accomplished in limited space with one hand.

A further object of the disclosed invention is to provide a quick-detachable connection for a linkage system in which an automatic visible signal, in the form of a bright colored warning stripe is provided when an improper and unsafe connection is attempted.

Other objects and advantages of the invention will be apparent from the following detailed description, together with the accompanying drawings, submitted for purposes of illustration only and not intended to define the scope of the invention, reference being had for that purpose to the subjoined claims.

Briefly, my quick-disconnect coupling for a tensional, compressional, and torsional force linkage system comprises the forming of two strong and light interlocking fingers on the tubular and hollow end of each connecting link, similar only in shape to the temporarily hooked, heavy solid bar fingers of the flexible wire ends shown slideable in a tube in Patent No. 2,296,993. In contrast, my assembly is a quick-disconnect coupling which contains further a sleeve slideable over the interlocked fingers and while being locked therewith against relative axial and torsional movements through co-action with a telescoping locking sleeve and two pins, the sleeve likewise fixes or locks the tubular ends together for transmission of tensional, compressional, and torsional forces, as well as withstanding column and bending loads. In the above noted patent, obviously the hooked wire ends fall apart during operation if actuated too far and out of its sleeve. While Patent No. 2,448,548 discloses a coupling with two knurled sleeves with a bayonet slot in one sleeve, this patent is inferior to the disclosed new quick-disconnect assembly because in this patent, all tensional and compressional forces fall on the small coupling pin. All of these forces in my disclosed quick-disconnect assembly are transmitted through the strong rod hooked connections and not through the pins therein.

For a better understanding of the invention, reference may be had to the following description taken in connection with the accompanying drawings in which:

Fig. 1 is a partially cut-away view in perspective of the complete quick-disconnect assembly for a linkage system;

Fig. 2 is a perspective view of the quick-connecting end of one of the rod segments with the retaining sleeve removed;

Fig. 3 is a view in perspective of the quick-connecting end of the other rod segments with its locking sleeve removed;

Fig. 4 is an enlarged partially cut-away perspective view of the retaining sleeve;

Fig. 5 is an enlarged cross section of the quick-disconnect coupling taken at 5—5 on Fig. 1 with the retaining sleeve removed for clarity of disclosure;

Fig. 6 is an enlarged perspective view of the locking sleeve;

Figure 7:
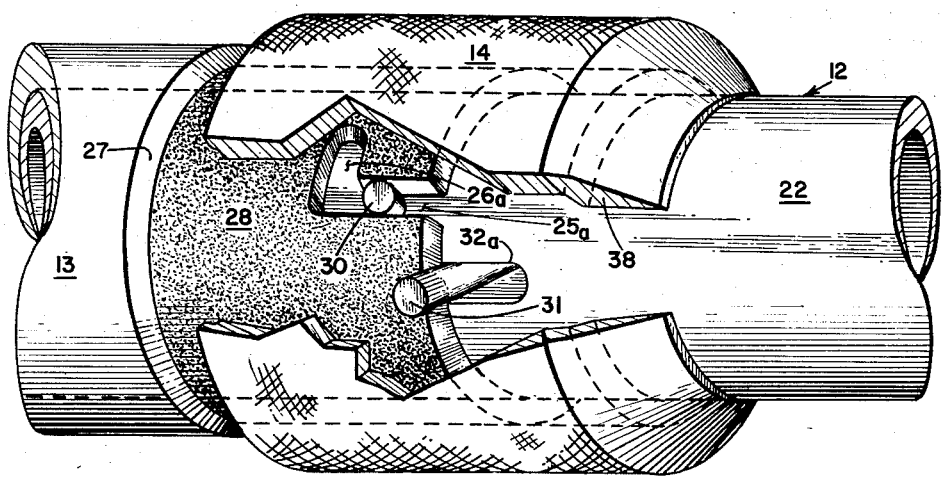
Fig. 7 is a partially cut-away enlarged view in perspective of the quick-disconnect coupling in unlocked and unsafe position with the red warning stripe so indicating the unsafe position.

The disclosed quick-disconnect locking coupling or assembly for a tensional, compressional, or torsional force linkage system may be constructed on the adjoining ends of two hollow links or the assembly permits construction on two tubular rod segments wherein the rod segments are adaptable for attachment of two ends of a linkage system desired to be interconnected or locked together.

In either case, the quick-disconnect coupling comprises the new combination on the adjoining ends of two rod segments or links, of interlocking fingers having two slideable telescopic sleeves locked thereover and thereto to provide a strong but light, safe, positive, and fool-proof coupling for transmitting tensional, compressional, and torsional forces.

The complete and locked quick-disconnect coupling illustrated in Fig. 1 comprises two tubular rod segments 11 and 12 having two telescopic sleeves 13 and 14 mounted over the interlocked ends of the rod segments wherein the segments provide for transmission of the tensional, compressional, and torsional loads between two links in an aircraft control linkage system (not shown). This assembly is so designed, as will be shown hereinafter, that the two rod segments carry and transmit the principal tensional, compressional, and torsional forces.

Left-hand rod segment 11

Each of the tubular rod segments 11 and 12 has secured at its outer end standard rod end fittings 15 and 16, respectively, with the respective rivets 17 and 18, the fittings being adapted to connect these rod segments into the linkage system described above. The directional terms "outer" and "inner" used herein apply to the direction axially along the rod segments as being either outwardly away from the rod segment interlocking fingered ends, or inwardly towards the rod segment interlocking fingered ends, respectively. Rod segment 11, Fig. 2, has two stubby, strong, and hooked fingers 19a and 19b on its slightly enlarged inner end portion 21 for interlocking with like complementary fingers 20a and 20b on the hollow inner end portion 22 of rod segment 12, end portions 21 and 22 being of the same diameter. While end 21 is preferably hollow like end 22 for various and obvious reasons, as to provide high strength and low weight, etc., it may be solidified if so desired.

Left-hand retaining sleeve 13

A retaining sleeve 13, Figs. 1 and 4, is slideably retained on rod 11 and serves to retain rod segments 11 and 12 in interlocked relationship. Rivets 17, positioned at the outer end of rod segment 11, limit outward movement of the sleeve, i. e., to the left in Fig. 1. Inward movement of the sleeve 13 on rod 11 is limited by contact of an internal radially extending flange 23, Figs. 1 or 4, in the outer or left end of the sleeve with a raised shoulder 24 formed by the enlarged and fingered inner end portion 21 of rod segment 11. Accordingly the internally flanged outer or left end of sleeve 13, Fig. 1, slides over the outer or left reduced portion of rod segment 11, while the inner end portion 21 of rod segment 11 and over the inner end portion 22 of rod segment 12 when the latter rod segment is connected to the former rod segment 11. Sleeve 13 further has two diametrically opposed bayonet slots in the right end thereof, Figs. 4, 7, and 8, each slot consisting of an axial slot portion 25 that is parallel to the tube longitudinal axis and a transverse slot portion 26 normal to the tube longitudinal axis. For purposes of clarity, the various parts of the bayonet slot on one side of the inner end of sleeve 13 have the subscript *a* and the parts of the other bayonet slot on the other side of the sleeve have the subscript *b*, the latter slot not shown. The outside diameter of the portion of the sleeve 13 which contains the bayonet slots 25a—26a and 25b—26b is reduced, as by machining or the like, leaving a shoulder 27, Figs. 1, 4, and 7, on the outside periphery of the sleeve. As will be further evident hereinafter, the area 28, Figs. 1, 4, and 7 of the sleeve reduced diameter portion adjacent shoulder 27 will be left exposed and in full view as long as the quick-disconnect assembly is not completely and securely locked. This sleeve area 28 is painted a bright color, as red for example, and serves as a warning to indicate the assembly is unlocked. A decalcomania having a red arrow pointing toward the brightly colored area 28, wherein the showing of any of this area indicates an unlocked and unsafe connection, has the following wording, or the like:

**WARNING
lock unsafe ⟶
with exposed
red stripe**

A diamond-knurled area 29, Fig. 4, on the left end of the sleeve 13, provides a grip-area for turning and sliding the sleeve on the rod 11.

Right-hand rod segment 12

After the strong stubby fingers 20a and 20b on the hollow inner end 22 illustrated on the right-hand side of rod segment 12 in the drawings, are interlocked with the fingers 19a and 19b on the inner end portion 21 of rod segment 11 then the sleeve 13 is slid over the interlocking ends until contact is made with a short fixed pin 30 protruding from opposite sides of the inner end of rod segment 12 in which it is fixedly secured. Short pin 30, which is a length substantially equal to the outside diameter of the bayonet slotted end of the sleeve 13, accordingly protrudes beyond the surface of rod segment 12 only a distance equal to or slightly less than the thickness of the sleeve end material. During the locking operation, the pin ends pass through bayonet axial slot portions 25a and 25b into bayonet transverse slot portions 26a and 26b of sleeve 13, as by rotation and sliding of the sleeve over the rods, whereby the sleeve is then locked against axial movement.

Figure 8:
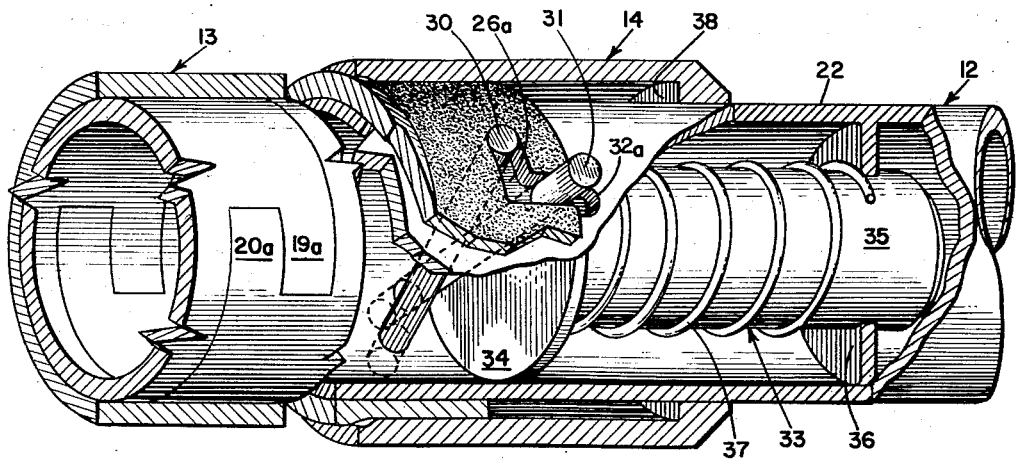
Fig. 8 is a partially cut-away enlarged perspective view of the quick-disconnect coupling in locked, safe position.

A second and longer pin 31, Figs. 1, 5, 7, and 8 protrudes from diametrically opposite axially elongated slots 32a, Fig. 7, and 32b (not shown) in the inner end portion 22 of rod segment 12, and carries sleeve 14. This sleeve 14 is so carried that sleeve 13 may be telescoped therein, as will be described hereinafter. Each end of the longer pin 31 is secured to the sleeve 14 as by press fitting, or the like. Long pin 31, as well as adjacent short pin 30, are each positioned diametrically of the hollow end portion of rod segment 12 with the shorter pin inwards of the longer pin, i. e., closer to the rod fingered end than the longer pin. As viewed in Fig. 5, where longer pin 31 is shown lying in a horizontal plane, the plane of shorter pin 30 including the tube longitudinal axis forms a small angle with the horizontal plane, as 30 degrees counter-clockwise for example. Obviously this angle may be varied as is determined by the length of the transverse slot portions 26, Fig. 8. As viewed in Figs. 7 and 8 of the drawings, pin 31 with sleeve 14 attached thereto is spring biased to the left end of the slots 32 by flat headed and axially slideable plunger 33. As illustrated in Fig. 8, this plunger is reciprocally mounted internally of the hollow end portion 22 of rod segment 12 with its flat head 34 actuatable or slideable internally of the rod segment and its other end or shank 35 actuatable or slideable in bulkhead 36. The plunger is urged to the left by spring 37 which is coiled around the plunger shank 35 and compressed between the plunger flat head 34 and the rod bulkhead 35.

Locking sleeve 14

With locking sleeve 14 secured over the inner end 22 of rod segment 12 with long pin 31, longitudinal or axial movement of the sleeve is permitted as limited by the length of slots 32 while the sleeve is restrained against transverse or rotary movement. Due to the compression spring tending to force plunger 33 and pin 31 to the left, Fig. 8, sleeve 14 is accordingly spring biased to the left as permitted by slots 32. While the sleeve 14, Figs. 1, 7, and 8, is of such diameter as to permit free movement over the ends or extremities of short pin 30, also sleeve 13 may be slid under and between the sleeve 14 and the rod segment 12, i. e., telescoped in sleeve 14. Further, the outer or right-hand end of the sleeve 14 is supported and guided on rod segment 12 by internal radially extending flange 38 in slideable contact with the rod segment. With pin 30 in the transverse portions 26 of the bayonet slot locking the retaining sleeve 13 against axial movement, Fig. 8, pin 31 of spring biased locking sleeve 14 is maintained in the axial portions 25 of the bayonet slots to lock retaining sleeve 13 against transverse or rotary movement about the rod segments.

Operation

With the retaining sleeve 13 pulled back to the left sufficiently to expose fingers 19a and 19b of tubular rod segment 11, these fingers are hooked or mated with the fingers 20a and 20b of the other rod segment 12, thus aligning and joining the two rod segments 11 and 12. The retaining sleeve 13 is then slid over the interlocked fingered ends of the two rod segments and telescoped into the locking sleeve 14 until the edge of the retaining sleeve contacts the short pin 30 and is restrained from further axial movement. After revolving the retaining sleeve 13 on the interlocked rod segments 11, 12, until the bayonet slot comes into alignment with the ends of short pin 30, the sleeve is then slid further over the rod segment 12 with the pin entering the axial portions 25a and 25b of the bayonet slots until limited from further axial movement by contact of the sleeve with the long pin 31, the relative position now occupied by the various parts of the quick-disconnect assembly being shown in Fig. 7. The portion of the colored reduced area 28 on sleeve 13 left exposed provides a bright colored warning stripe indicating the assembly is not completely and safely locked. To finish locking the assembly, locking sleeve 14 is urged to the right against the action of the spring 37 to move pin 31 to the right in its slots 32a and 32b. After further axial and telescoping movement of the retaining sleeve 13 into locking sleeve 14 until pin 30 reaches the left end of axial portions 25 of the sleeve bayonet slots, the retaining sleeve is then rotated transversely about its longitudinal axis until stopped by pin 30 abutting against the end of transverse portions 26 of the sleeve bayonet slot. Because of the particular angle the pins 30 and 31 are positioned relative to each other in rod segment 12, when the retaining sleeve is rotated until the ends of its transverse slot portions 26 contact pin 30, the pin 31 is aligned with the axial slot portions 25. With release of the locking sleeve, the sleeve spring 37 actuates the sleeve and the pin 31 carried thereby to the left until further movement is limited by the pin abutting the left end of its slots 32, which abutment positions the pin intermediate the ends of axial slot portions 25, as illustrated in its safely locked position of Fig. 8. Accordingly, the fingers of the two rods are maintained interlocked together by the retaining sleeve positioned therearound, and this retaining sleeve is locked against axial movement by pin 30 and is locked against transverse or rotational movement by pin 31, as shown in Fig. 8.

The disclosed quick-disconnect coupling is conducive to fast locking by the preferred following one hand method. After gripping the retaining sleeve in the knurled area 29 and sliding the sleeve over the interlocked fingered rod ends to in abutting relation with the pin 30, the sleeve is then rotated transversely about the rods until pin 30 contacts the edges or openings of the two bayonet slots 25a—26a, 25b—26b and then further axial movement of the sleeve to the right causes the pin ends to penetrate the slots until movement of the sleeve is stopped by its contact with long pin 31, the position now occupied shown in Fig. 7. Then while still gripping the retaining sleeve, it is actuated farther to the right to force locking sleeve 14 also to the right against its spring 37. While holding the retaining sleeve, as well as the locking sleeve, hard to the right, the retaining sleeve is again rotated slightly to move the bayonet slot 25a—26a and also bayonet slot 25b—26b on the diametrically opposite side of sleeve 13 until the axial slot portions 25 become aligned with pin 31, as illustrated in Figs. 7 and 8, wherein the pin is now spring biased or snapped into the slot portion by its spring 37 to securely and positively lock the quick-disconnect assembly.

To disconnect the coupling, locking sleeve 14 may be grasped in the palm of the right hand with the last three fingers and pulled to the right, compressing spring 37, and immediately thereafter, rotating retaining sleeve 13 slightly with the thumb and forefinger until pin 30, which is in the transverse slot portions 26, has reached its limit of motion and is in alignment with the axial slot portions 25. The retaining sleeve while still being held with the thumb and forefinger is then actuated to its far left position while relaxing the grip on the locking sleeve to permit the rod fingered end portions to be unhooked, each of sleeves 13 and 14 being retained on their respective rod end portions, 21 and 22.

It is deemed clearly evident from the above disclosure how this invention provides a quick-disconnect coupling for a tensional, compressional, or torsional force linkage system which enables quick disconnection and re-engagement without necessitating detachment at the link ends, is strong but light, is readily attachable and detachable with one hand, maintains the length adjustment constant, and provides an automatic visible signal when an improper and unsafe connection is left. Therefore this invention has been shown to be conducive to rapid operation in cramped, limited quarters and provides a slip-proof and positive locking coupling between two linking rods for transmitting tensional, compressional, and torsional forces.

It will be obvious to those skilled in the art that various changes may be made in the quick-disconnected coupling without departing from the spirit and scope thereof and therefore the invention is not limited by that which is shown in the drawings and described in the specification, but only as indicated in the appended claims.

I claim:

1. A high-strength light-weight quick-disconnect coupling for transmission of tensional, compressional, and torsional forces comprising, two rod segments having detachably interlocked hooked ends for transmitting tensional forces, two sleeve members, both of said sleeve members being axially slideable on said segments and telescopic with respect to each other, one of said sleeve members having a locking slot therein, and the other of said sleeve members and one of said rod segments having locking pin members cooperative with said slot to lock one of said sleeve members over said interlocked ends.

2. A high-strength light-weight quick-disconnect coupling for transmission of tensional, compressional, and torsional forces comprising, two rod segments having detachably interlocked ends, first means axially slideable on one of said segments and slideable over said interlocked ends, second means axially slideable on the other of said segments, both of said first and second means being telescopic with respect to each other, and said second means and said other segment having means for locking one of said slideable means over said locked ends.

3. A high-strength light-weight quick-disconnect coupling for transmission of tensional, compressional, and torsional forces comprising, two rod segments having detachably interlocked fingered ends, first means axially slideable on one of said segments and slideable over said interlocked ends, said first means also having a bayonet type slot with an axial slot portion, said other segment having a pin therein with its ends protruding diametrically therefrom, second means axially slideable over said protruding pin ends on said other segment, said second means having a diametrically protruding pin actuatable in said axial slot potrion in said other segment, and both of said means being telescopic with respect to each other to pass both said pins into said bayonet slot, for locking said first means over said locked ends.

4. A high-strength light-weight quick-disconnect coupling for transmission of tensional, compressional, and torsional forces comprising, two rod segments having interlocked ends, first means slideably secured on one of said ends, second means slideably secured on the other of said ends, said first means being slideable over said interlocked ends and telescopic in said second means, said second means being movable axially and telescopically over said first means, and said second means and one of said rod segments having means for locking said first means against both axial and torsional movement relative to said rod segments.

5. A high-strength light-weight quick-disconnect coupling for transmission of tensional, compressional, and torsional forces comprising, two links of the linkage system having detachably interlocked fingered ends, first means actuatable axially on one of said link ends and actuatable oversaid interlocked ends, said first means also having a bayonet slot, said other link end having a pin therein with its ends protruding diametrically therefrom, second means actuatable on said other link over said protruding pin ends, said second means having a diametrically protruding pin actuatable in an axial slot in said other link end, and both of said means being telescopic with respect to each other to pass both of said pins into said bayonet slot for locking said first means over said locked link ends.

6. A high-strength light-weight quick-disconnect coupling for transmission of tensional, compressional, and torsional forces comprising, two rod segments having detachably interlocker fingered ends, first means axially slideable on one of said segments and slideable over said interlocked ends, said first means also having a bayonet type slot, said other segment having a pin therein with its ends prrotruding diametrically therefrom, second means axially slideable over said protruding pin ends on said other segment, said second means having a diametrically protruding pin actuatable in an axial slot in said other segment, third means for biasing said second means towards said first means, and both of said first and second means being telescopic with respect to each other for passing both of said pins into said bayonet slot wherein said spring-biased second means locks said first means over said interlocked ends.

7. A high-strength light-weight quick-disconnect locking coupling for transmission of tensional, compressional, and torsional forces comprising, two links having detachably interlocked ends, first means axially slideable on one of said link ends and slideable over said interlocked ends, second means axially slideable on the other of said link ends, both of said means being telescopic with respect to each other, and third means on said other link end and on said first slideable means for locking said first telescopic means over said interlocked link ends.

8. A high-strength light-weight quick-disconnect coupling for transmission of tensional, compressional, and torsional forces comprising, two rod segments having detachably locked ends, two means being axially slideable on said rod segments and telescopic with respect to each other, one of said telescopic means and one of said rod segments having means to lock one of said telescopic means over said interlocked rod segment ends, and an indicating means on the end of one of said telescopic means responsive to an unlocked and unsafe connection in said coupling.

9. A high-strength light-weight quick-disconnect coupling for transmission of tensional, compressional, and torsional forces comprising, first and second tubular links having detachably interlocked hollow ends, the interlocking end of said first link being of the same outside diameter as that of said second link and having two strong stubby hooked fingers, the interlocking end of said second link having two strong stubby hooked fingers complementary to the other hooked fingers, a first sleeve member axially slideable on the hollow end of said first link and slideable over said interlocked ends, said first sleeve member being slideably retained on said first link end, an end of said first sleeve member having a bayonet slot therein, said bayonet slot having a transverse portion and an axial portion, the end of said second link having a first pin therein with its ends protruding diametrically therefrom, the length of said pin being substantially equal to the diameter of said first sleeve member, a second sleeve member axially slideable over said protruding pin ends on said second link, said second sleeve member having a diametrically protruding second pin actuatable in an axial slot in said second link end, a compression spring member for biasing said second sleeve member and said second pin towards said first sleeve member, and both of said sleeve members being telescopic with respect to each other to pass said first pin into said bayonet slot transverse portion to lock said first sleeve against axial movement and to pass said second pin into said bayonet slot axial portion to lock said first sleeve against transverse movement wherein said spring biased second sleeve member locks said first sleeve member over said locked link ends for providing a quick-disconnect coupling.

10. A high-strength light-weight quick-disconnect coupling for transmission of tensional, compressional, and torsional forces comprising, two rods having detachable locked ends, first means axially slideably retained on one of said rods, and second means axially slideably retained on said other rod, said two means being telescopic one within the other, and said first means and said one rod having means to lock said second means over said interlocked rod ends.

11. A high-strength light-weight quick-disconnect coupling for transmission of tensional, compressional, and torsional forces comprising, two rods having detachably locked ends, a pin mounted in one of said rods with ends protruding diametrically from said one rod, first means slideably retained on said one rod, and second means slideably retained on said other rod, said second slideable means being slideable over said protruding pin ends and telescopic with said first means, and said second means having means cooperative with said pin and said first means to lock said first slideable means telescopically over said interlocked rod ends.

12. A high-strength light-weight quick disconnect coupling for transmission of tensional, compressional, and torsional forces comprising, two rods having detachably locked ends, a pin mounted in one of said rods, said rod having first means slideably retained thereon, second means slideably retained on said other rod, and a second pin mounted in said first slideable means, said second slideable means having a bayonet slot therein for receiving said pins, and said first and second slideable means being operable to pass both of said pins into said bayonet slot for locking said second means over said locked rod ends.

References Cited in the file of this patent
UNITED STATES PATENTS

| | | |
|---|---|---|
| 2,296,993 | Gerry | Sept. 29, 1942 |
| 2,448,548 | Purdy | Sept. 7, 1948 |
| 2,527,256 | Jackson | Oct. 24, 1950 |